US012747954B2

(12) United States Patent
Horiuchi et al.

(10) Patent No.: US 12,747,954 B2
(45) Date of Patent: Sep. 29, 2026

(54) RISK AREA INFORMATION TRANSMITTING APPARATUS, RISK AREA INFORMATION TRANSMITTING METHOD, AND COMPUTER-READABLE STORAGE MEDIUM

(71) Applicants: HONDA MOTOR CO., LTD., Tokyo (JP); SoftBank Corp., Tokyo (JP)

(72) Inventors: Moriya Horiuchi, Saitama (JP); Takahiro Kurehashi, Saitama (JP); Yuta Sakagawa, Saitama (JP); Koichi Serizawa, Tokyo (JP); Koyo Enomoto, Tokyo (JP)

(73) Assignees: HONDA MOTOR CO., LTD., Tokyo (JP); SoftBank Corp., Tokyo (JP)

(*) Notice: Subject to any disclaimer, the term of this patent is extended or adjusted under 35 U.S.C. 154(b) by 121 days.

(21) Appl. No.: 18/786,503

(22) Filed: Jul. 28, 2024

(65) Prior Publication Data

US 2025/0044109 A1 Feb. 6, 2025

(30) Foreign Application Priority Data

Jul. 31, 2023 (JP) ................................ 2023-124122

(51) Int. Cl.

| | |
|---|---|
| ***G01C 21/34*** | (2006.01) |
| ***B60K 35/23*** | (2024.01) |
| ***B60W 30/09*** | (2012.01) |
| ***B60W 50/14*** | (2020.01) |
| ***G06V 20/56*** | (2022.01) |

(52) U.S. Cl.

CPC .......... *G01C 21/3461* (2013.01); *B60K 35/23* (2024.01); *B60W 30/09* (2013.01); *B60W 50/14* (2013.01); *G06V 20/56* (2022.01); *B60W 2050/143* (2013.01); *B60W 2556/45* (2020.02)

(58) Field of Classification Search

CPC ... G01C 21/3461; B60K 35/23; B60W 30/09; B60W 50/14; B60W 2050/143; B60W 2556/45; G06V 20/56

See application file for complete search history.

(56) References Cited

U.S. PATENT DOCUMENTS 10,716,093 B2 * 7/2020 Seo ........................ H04W 88/04
2018/0096600 A1 * 4/2018 Bletzer ..................... B60R 1/27

(Continued)

FOREIGN PATENT DOCUMENTS

JP 2021140470 A 9/2021

*Primary Examiner* — Hunter B Lonsberry
*Assistant Examiner* — Harrison Heflon

(57) ABSTRACT

Included are a storage unit which stores position information of a plurality of risk areas which may pose a risk for a vehicle to travel; a rearrangement unit which rearranges the plurality of risk areas in order of proximity to a vehicle which is a transmission destination of the plurality of risk areas; and a transmitting unit which transmits the position information of the plurality of risk areas rearranged by the rearrangement unit to the vehicle. A risk area information transmitting method comprises: storing position information of a plurality of risk areas which may pose a risk for a vehicle to travel; rearranging the plurality of risk areas in order of proximity to a vehicle which is a transmission destination of the plurality of risk areas; and transmitting the position information of the plurality of risk areas rearranged by the rearrangement unit to the vehicle.

17 Claims, 13 Drawing Sheets

(56) References Cited

U.S. PATENT DOCUMENTS

| | | | | |
|---|---|---|---|---|
| 2021/0021376 | A1* | 1/2021 | Srivastava | H04L 1/0091 |
| 2021/0281968 | A1* | 9/2021 | Kurehashi | G08G 1/091 |
| 2022/0086609 | A1* | 3/2022 | Hwang | H04W 4/40 |
| 2022/0201779 | A1* | 6/2022 | Nakamura | H04W 40/12 |
| 2022/0319327 | A1* | 10/2022 | Nakamura | G08G 1/096791 |
| 2023/0303067 | A1* | 9/2023 | Duan | G08G 1/16 |

* cited by examiner

| RISK AREA ID | DETECTION TIME | STORAGE TIME | RISK FACTOR | RISK AREA COORDINATES | LINK ID | LINK INTERSECTION POINT | ORIENTATION |
|---|---|---|---|---|---|---|---|
| 1110001 | 2023/4/1 10:00:00 | 2023/4/1 10:00:03 | 1 | (x11,y11) (x12,y12) | 10 | (x13,y13) | 1 |
| 1210002 | 2023/4/1 10:00:10 | 2023/4/1 10:00:13 | 1 | (x21,y21) (x22,y22) | 10 | (x23,y23) | 0 |
| 1310003 | 2023/4/1 10:00:30 | 2023/4/1 10:00:33 | 1 | (x31,y31) (x32,y32) | 10 | (x33,y33) | 1 |
| ⋮ | ⋮ | ⋮ | ⋮ | ⋮ | ⋮ | ⋮ | ⋮ |

FIG.7

RISK AREA INFORMATION TRANSMITTING APPARATUS, RISK AREA INFORMATION TRANSMITTING METHOD, AND COMPUTER-READABLE STORAGE MEDIUM

The contents of the following patent application(s) are incorporated herein by reference:

NO. 2023-124122 filed in JP on Jul. 31, 2023.

BACKGROUND

1. Technical Field

The present invention relates to a risk area information transmitting apparatus, a risk area information transmitting method, and a computer-readable storage medium.

2. Related Art

Patent Document 1 describes a system in which a MEC server manages a risk area, and the MEC server provides information on the risk area to each vehicle.

PRIOR ART DOCUMENT

Patent Document

Patent Document 1: Japanese Patent Application Publication No. 2021-140470

BRIEF DESCRIPTION OF THE DRAWINGS

FIG. 7 shows a data structure of risk area information stored in a storage unit 380 of the server 52.

DESCRIPTION OF EXEMPLARY EMBODIMENTS

The present invention will be described below through embodiments of the invention, but the following embodiments do not limit the invention according to the claims. In addition, not all of the combinations of features described in the embodiments are essential to the solution of the invention.

Figure 1:
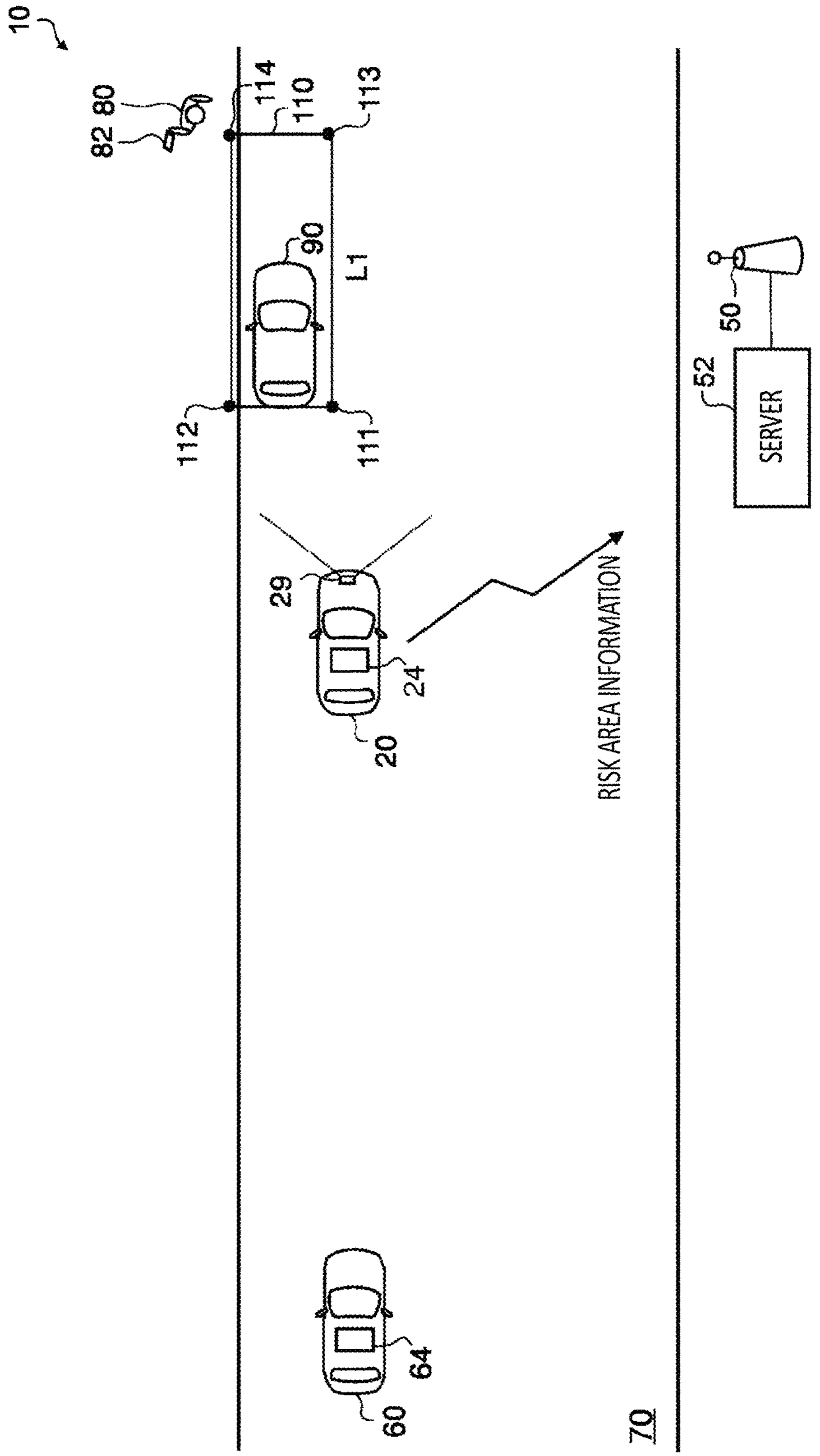
FIG. 1 schematically illustrates a usage scene of a system 10.

FIG. 1 schematically illustrates a usage scene of a system 10. The system 10 includes a vehicle 20, a vehicle 60, a terminal 82, a base station 50, and a server 52.

The vehicle 20 and the vehicle 60 are traveling on a road 70. The vehicle 20 includes an information processing apparatus 24 and a sensor 29. The sensor 29 is configured to include a camera. The information processing apparatus 24 includes a function of processing information acquired by the sensor 29 and a function of communicating with the server 52 external to the vehicle 60. The vehicle 20 includes, for example, an advanced driver assistance system (ADAS) function. The vehicle 60 includes an information processing apparatus 64. The information processing apparatus 64 includes a function of communicating with the server 52. The vehicle 60 does not include the ADAS function, for example.

The terminal 82 is carried by a person 80. The terminal 82 is, for example, a mobile terminal such as a smartphone. The base station 50 is for a mobile communication. The server 52 is connected to the base station 50. The server 52 may include an edge computing server such as a mobile edge computing (MEC) server, for example. The server 52 continuously manages position information of the terminal 82. For example, the server 52 manages the up-to-date position information transmitted from the terminal 82. It is to be noted that although FIG. 1 illustrates one server 52, the server 52 may be constituted by a plurality of servers respectively connected to a plurality of base stations on a one-on-one basis. The information processing apparatus 24 may communicate with a server in a vicinity of the vehicle 20 out of the plurality of servers constituting the server 52, and the information processing apparatus 64 may communicate with a server in a vicinity of the vehicle 60 out of the plurality of servers constituting the server 52.

In FIG. 1, the vehicle 20 and the vehicle 60 are travelling along the road 70. A vehicle 90 is parked on the road 70. The vehicle 60 travels behind the vehicle 20 in a same traveling direction as the vehicle 20.

For the vehicle 20, an area 110 on a traveling direction side of the vehicle 20 in front of the parked vehicle 90 is an area that is difficult to be visually recognized from a position of the vehicle 20. The information processing apparatus 24 identifies the area 110 that cannot be clearly viewed from the vehicle 20 as a risk area, based on information such as an image in a traveling direction acquired by the sensor 29.

For example, the information processing apparatus 24 determines four vertexes: a vertex 111, a vertex 112, a vertex 113, and a vertex 114 of a quadrangular area 110 including a position of the vehicle 90, based on recognition information of the image acquired by the sensor 29. The vertex 113 is a point away from the vertex 111 determined based on the recognition information of the image by a distance L1 in the traveling direction of the vehicle 20. The vertex 114 is a point away from the vertex 112 determined based on the recognition information of the image by the distance L1 in the traveling direction of the vehicle 20. L1 is a distance that has been determined according to a vehicle speed of the vehicle 20.

The information processing apparatus 24 transmits risk area information including the four vertexes: the vertex 111, the vertex 112, the vertex 113, and the vertex 114 to the server 52 to inquire of the server 52 whether the terminal 82 is present in the area 110. Since the terminal 82 is not present in the area 110 defined by the four vertexes: the vertex 111, the vertex 112, the vertex 113, and the vertex 114 in an example shown in FIG. 1, the server 52 discards inquiry information or transmits to the vehicle 20 response information notifying that the terminal 82 is not present.

The server 52 stores coordinate information of the two vertexes: the vertex 111 and the vertex 112 positioned on a side closer to the vehicle 20 out of the four vertexes: the vertex 111, the vertex 112, the vertex 113, and the vertex 114 included in the risk area information received from the information processing apparatus 24, and provides it to another vehicle including the vehicle 60 behind the vehicle 20.

Figure 2:
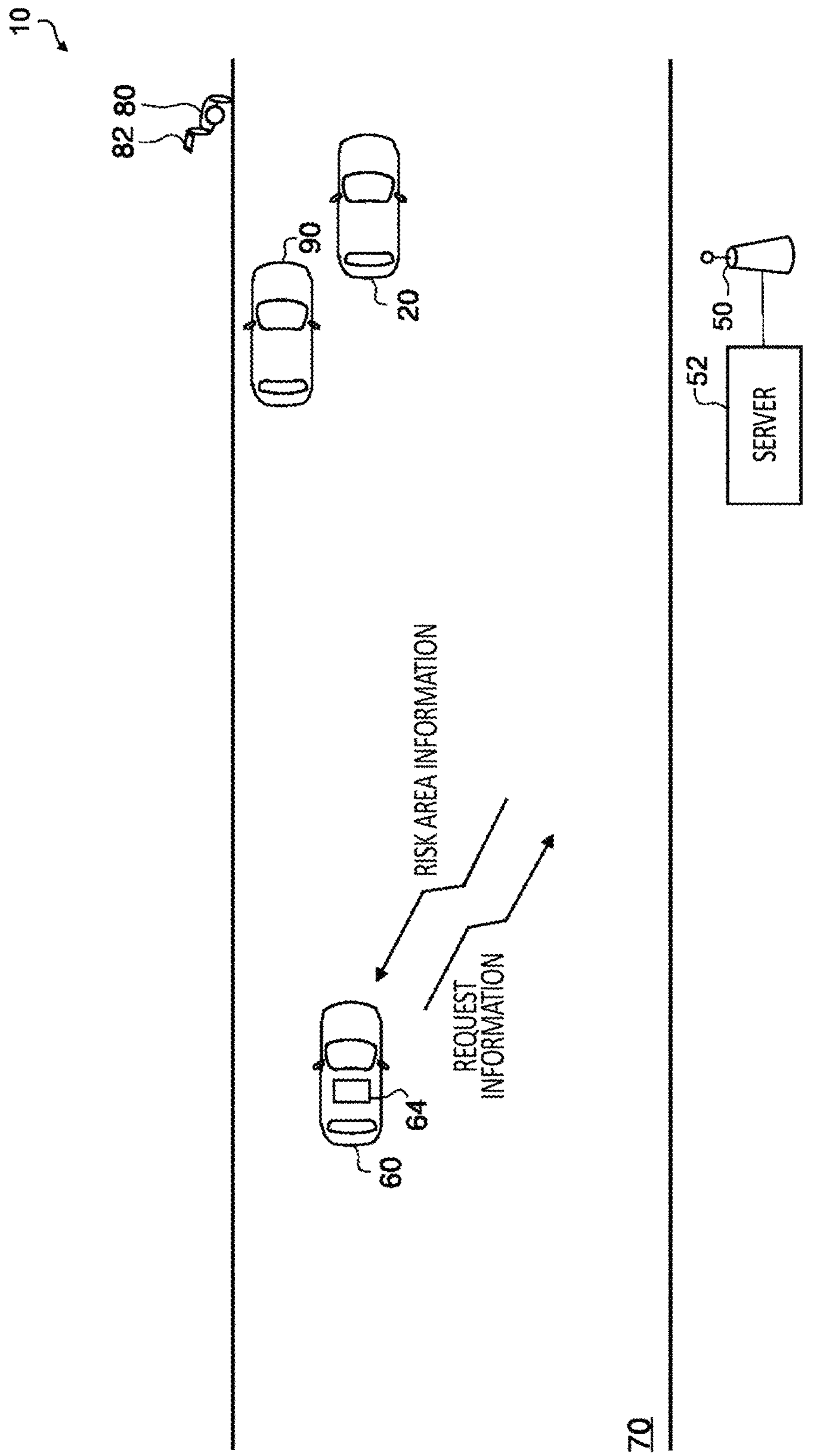
FIG. 2 illustrates a situation where an information processing apparatus 64 included in a vehicle 60 requests position information of a risk area.

FIG. 2 illustrates a situation where the information processing apparatus 64 included in the vehicle 60 requests the position information of the risk area. When the information processing apparatus 64 is present in an area where it can communicate with the server 52, the information processing apparatus 64 transmits request information for the risk area to the server 52. The server 52 transmits the risk area information, including the coordinate information of the vertex 111 and the vertex 112 in the area 110 it stores and identification information of the risk area, to the information processing apparatus 64. The information processing apparatus 64 stores information received from the server 52.

Figure 3:
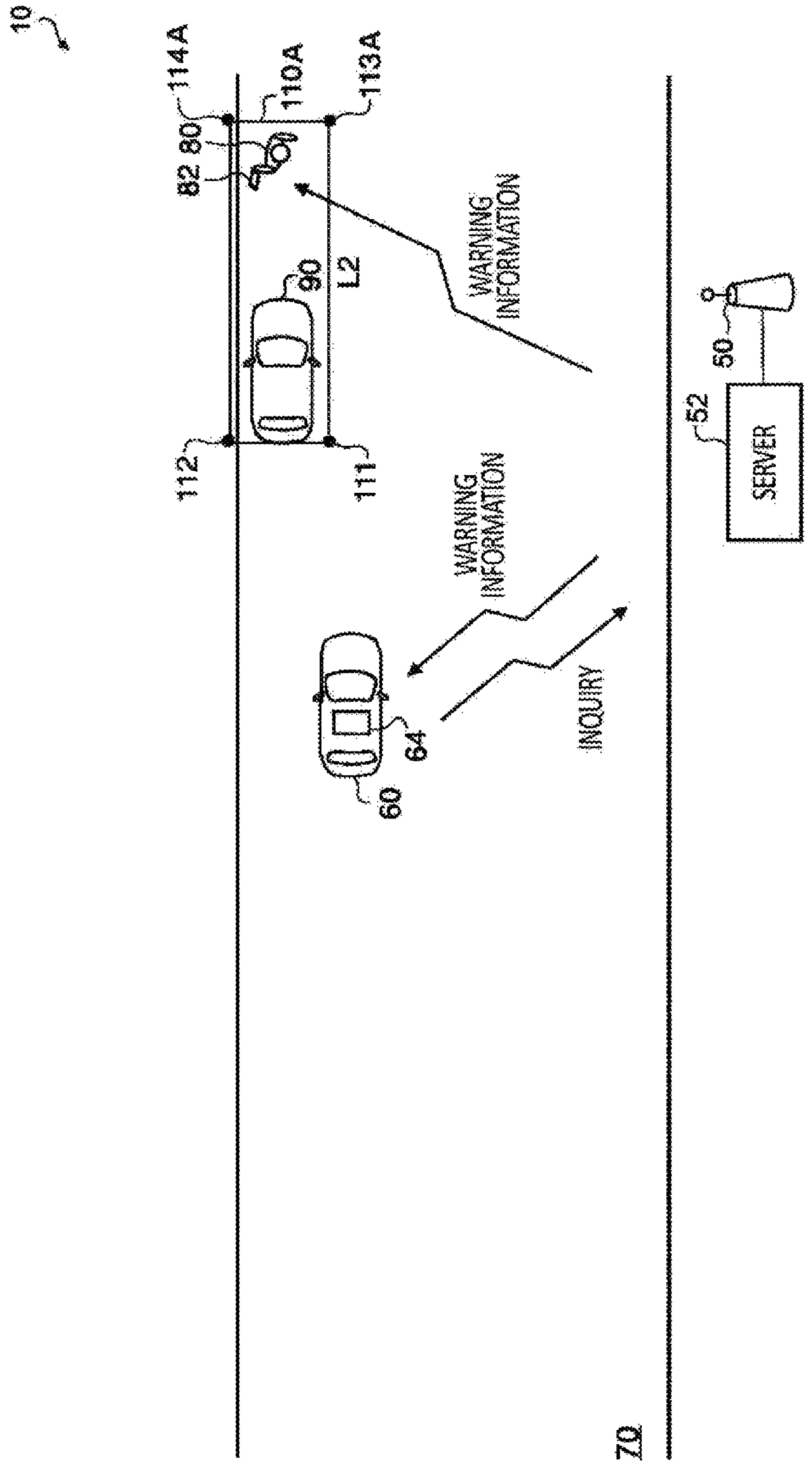
FIG. 3 illustrates a situation where the information processing apparatus 64 performs an inquiry related to the risk area.

FIG. 3 illustrates a situation where the information processing apparatus 64 performs an inquiry related to the risk area. When a distance of the vehicle 20 to a position indicated by the coordinate information of at least one of the vertex 111 or the vertex 112 becomes less than a predetermined distance, the information processing apparatus 64 transmits the inquiry information to the server 52. The inquiry information includes the identification information of the risk area received from the server 52.

The server 52 determines a vertex 113A and a vertex 114A at positions extended by a distance L2 in the traveling direction of the vehicle 60 from positions of the two vertexes: the vertex 111 and the vertex 112 of the risk area identified in the identification information of the risk area included in the inquiry information received from the information processing apparatus 64. The distance L2 may be set according to the vehicle speed of the vehicle 60. When the position information of the terminal 82 managed by the server 52 is included in an area 110A defined by the vertex 111, the vertex 112, the vertex 113A and the vertex 114A, the server 52 transmits warning information to the information processing apparatus 64 and the terminal 82. When the information processing apparatus 64 receives the warning information from the server 52, the information processing apparatus 64 outputs a warning to a passenger of the vehicle 60. For example, the information processing apparatus 64 outputs the warning to the passenger through an HMI (Human Machine Interface) function included in the vehicle 20. Accordingly, even when the information processing apparatus 64 itself does not have a function of recognizing the risk area by sensing means such as a camera, the information processing apparatus 64 can output the warning by using the risk area received from the server 52 by way of a wireless communication function. In addition, when the terminal 82 receives the warning information from the server 52, the terminal 82 outputs the warning to the person 80. For example, the terminal 82 outputs the warning to the person 80 through the HMI function included in the terminal 82.

Figure 4:
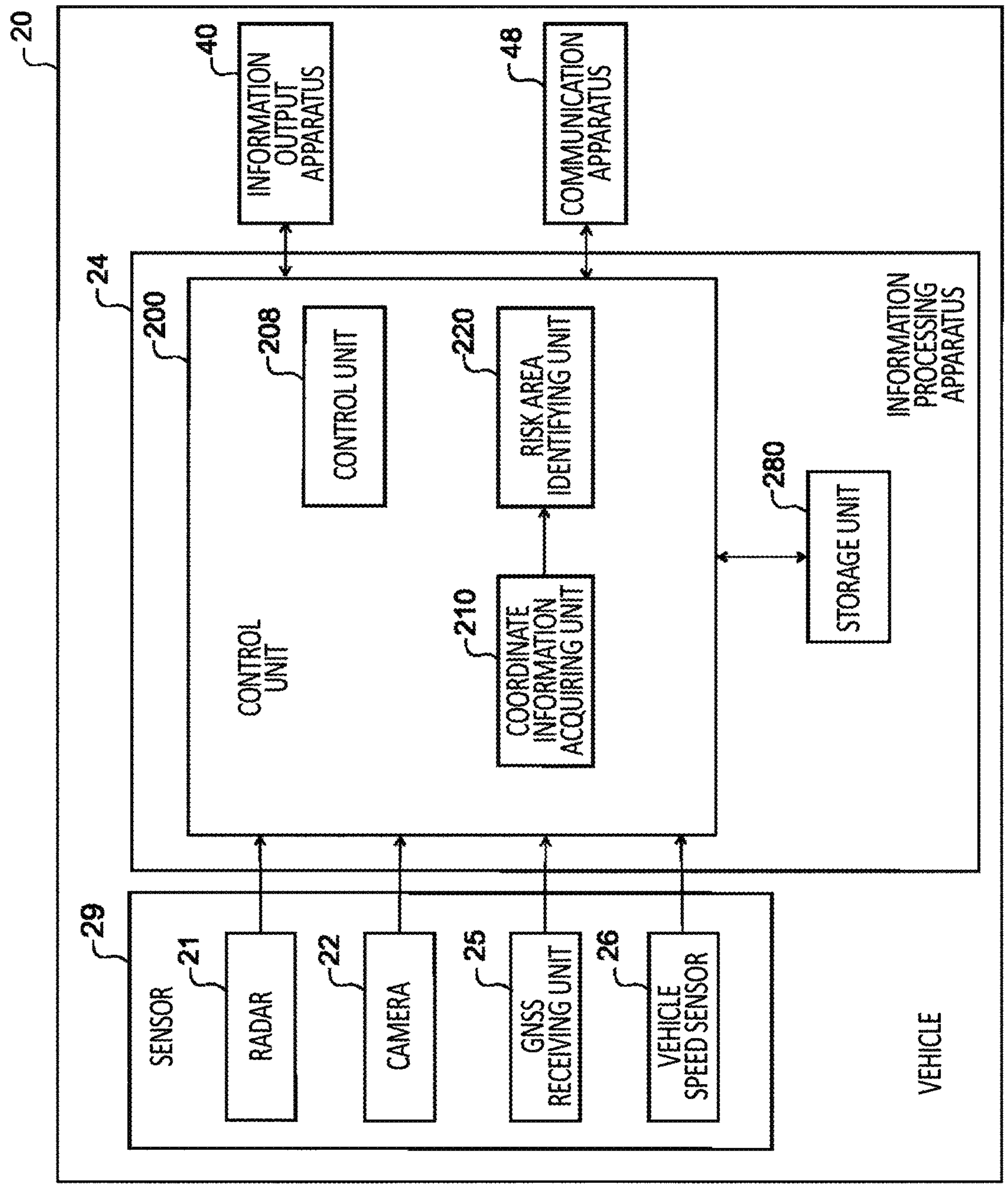
FIG. 4 illustrates a system configuration of a vehicle 20.

FIG. 4 illustrates a system configuration of the vehicle 20. The vehicle 20 includes the sensor 29, the information processing apparatus 24, a communication apparatus 48, and an information output apparatus 40.

The sensor 29 includes a radar 21, a camera 22, a GNSS receiving unit 25, and a vehicle speed sensor 26. The radar 21 may be a LIDAR, a millimeter wave radar, or the like. The GNSS receiving unit 25 receives a radio wave transmitted from a GNSS (Global Navigation Satellite System) satellite. The GNSS receiving unit 25 generates information indicating a current position of a vehicle 20 based on a signal received from the GNSS satellite. The camera 22 is an example of an image-capturing apparatus mounted on the vehicle 20. The camera 22 captures surroundings of the vehicle 20 to generate image information. For example, the camera 22 captures an image in the traveling direction of the vehicle 20 to generate the image information. The camera 22 may be a monocular camera. The camera 22 may be a compound eye camera which can acquire information on a distance to an object. The camera 22 recognizes an object based on an image acquired by an image capturing function to output the position information of the recognized object. The vehicle speed sensor 26 detects the vehicle speed of the vehicle 20. It should be noted that the sensor 29 may include a position sensor such as an odometer or an IMU (inertial measurement unit) such as an acceleration sensor and a posture sensor.

The vehicle 20 may include a driver assistance control apparatus which performs driver assistance for the vehicle 20 by using information detected by the sensor 29. The driver assistance control apparatus may be implemented by an ECU which provides the ADAS function.

The communication apparatus 48 is responsible for communication with the server 52. The communication apparatus 48 may communicate with the server 52 through a mobile communication. The communication apparatus 48 may be capable of communicating, for example, through a communication via mobile base station (Uu) interface for vehicle-to-vehicle communication.

The information output apparatus 40 outputs the warning information. The information output apparatus 40 may have the HMI function. The information output apparatus 40 may include a head-up display and a navigation system. The information output apparatus 40 may be a mobile terminal carried by the occupant of the vehicle 20. The information output apparatus 40 may include a sound output apparatus which outputs the warning information by sound.

The information processing apparatus 24 includes a control unit 200 and a storage unit 280. The control unit 200 is implemented by, for example, a circuit of an arithmetic processing apparatus including a processor and the like. The storage unit 280 is implemented to include a non-volatile storage medium. The control unit 200 performs processing by using information stored in the storage unit 280. The control unit 200 may be implemented by an ECU (Electronic Control Unit) including a microcomputer including a CPU, ROM, RAM, I/O, bus, and the like.

The control unit 200 includes a coordinate information acquiring unit 210, a risk area identifying unit 220, and a control unit 208. A form may be adopted in which the control unit 200 does not have some function of functional blocks shown in FIG. 4. For example, a form may be adopted in which only a part of functions is implemented in the control unit 200, and other functions are implemented as functions of another circuit such as the sensor 29.

The risk area identifying unit 220 identifies the risk area outside of the vehicle 20. The communication apparatus 48 transmits the risk area information indicating the risk area identified by the risk area identifying unit 220 to a server which holds risk area-related information. The risk area identifying unit 220 may identify an area defined by a plurality of points as the risk area, and the communication apparatus 48 may transmit coordinate information of the plurality of points to the server 52 as the risk area information. The plurality of points which define the risk area may be a plurality of vertexes which define an area identified as the risk area. The plurality of points which define the risk area may be the plurality of vertexes which define a polygonal area identified as the risk area.

The risk area may be an area outside of the vehicle 20, which poses a risk for the vehicle 20 to travel. The risk area may be an area that is Non-Line-of-Sight from the position of the vehicle 20 due to an object outside of the vehicle 20. The area that is Non-Line-of-Sight refers to, for example, the position information of an area where occlusion has occurred due to blocking by a three-dimensional object such as the another vehicle, a building, and a roadside tree when viewed from the position of the vehicle 20.

The coordinate information acquiring unit 210 acquires the coordinate information of an object recognized from an image obtained by capturing the outside of the vehicle 20 by the camera 22 mounted on the vehicle 20. The risk area identifying unit 220 may identify the risk area based on the coordinate information of the object recognized from the image obtained by capturing the outside of the vehicle 20 by the camera 22.

The control unit 208 may perform control to execute driver assistance of the vehicle 20 or warning to the occupant of the vehicle 20. For example, when the information output apparatus 40 includes a head-up display, the control unit 208 may cause the head-up display of the vehicle 20 to output light for forming a mark as the warning information indicating that a pedestrian is present in the risk area. In addition, the control unit 208 causes the head-up display to output light for forming a mark in a display area corresponding to a position of the risk area in which the pedestrian is present. The control unit 208 may project the light for forming mark towards a reflective member provided on a windshield of the vehicle 20. The control unit 208 may output the warning information by sound or text. Further, the control unit 208 may control traveling of the vehicle 20 through the driver assistance control apparatus included in the vehicle 20.

Figure 5:
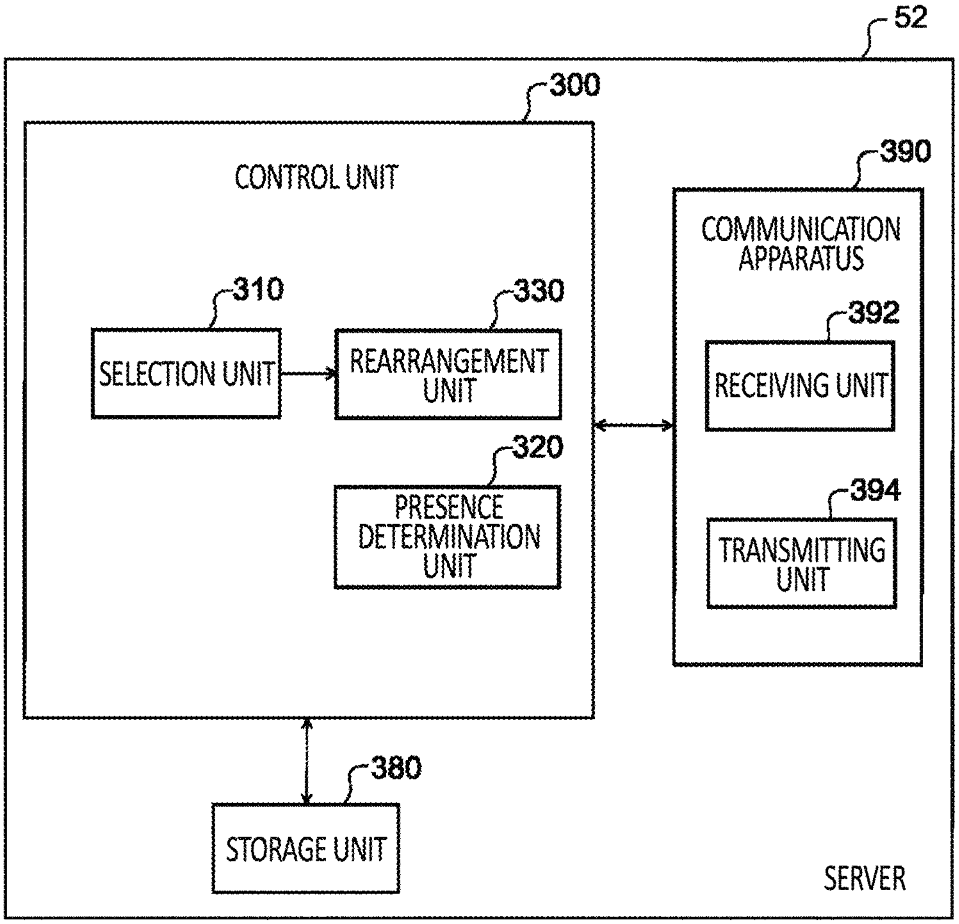
FIG. 5 illustrates a system configuration of a server 52.

FIG. 5 illustrates a system configuration of the server 52. The server 52 includes a communication apparatus 390, a control unit 300, and a storage unit 380.

The control unit 300 performs control of the communication apparatus 390. The communication apparatus 390 is responsible for communication between the terminal 82 and the information processing apparatus 24. The communication apparatus 390 includes a receiving unit 392 and a transmitting unit 394. The control unit 200 is implemented by, for example, the circuit of the arithmetic processing apparatus including a processor, and the like. The storage unit 380 is implemented to include a non-volatile storage medium. The control unit 300 performs processing by using information stored in the storage unit 380. The control unit 300 may be implemented by a microcomputer including a CPU, a ROM, a RAM, an I/O, a bus, and the like.

The control unit 300 includes a selection unit 310, a presence determination unit 320, and a rearrangement unit 330. A form may be adopted in which the control unit 300 does not have some function of functional blocks shown in FIG. 5.

The receiving unit 392 receives the risk area information indicating the risk area outside of the vehicle 20 identified by the vehicle 20.

The storage unit 380 stores the position information of a plurality of risk areas which may pose a risk for a vehicle to travel. The rearrangement unit 330 rearranges the plurality of risk areas in order of proximity to a vehicle which is a transmission destination of the plurality of risk areas. The transmitting unit 394 transmits the position information of the plurality of risk areas rearranged by the rearrangement unit 330 to the vehicle.

The rearrangement unit 330 rearranges the plurality of risk areas in order of proximity to the vehicle which is the transmission destination to generate transmission data including the position information of the plurality of risk areas. The transmitting unit 394 transmits the transmission data generated by the rearrangement unit 330 to the vehicle which is the transmission destination.

The rearrangement unit 330 may rearrange the plurality of risk areas in order of proximity to the vehicle which is the transmission destination, along the traveling direction of the vehicle which is the transmission destination. The storage unit 380 may further store the position information of the plurality of risk areas in association with the coordinate information of an intersection point between a perpendicular line from a predetermined point for identifying a position of each of the plurality of risk areas to a link along which the vehicle travels and the link. The rearrangement unit 330 may rearrange, based on the coordinate information of the intersection point between the perpendicular line and the link, the plurality of risk areas in order of proximity to the vehicle which is the transmission destination, along the traveling direction of the vehicle which is the transmission destination.

The receiving unit 392 receives the request information for requesting the position information of the risk area from the vehicle. The rearrangement unit 330 rearranges the plurality of risk areas in order of proximity to the vehicle from which the request information is transmitted, and the transmitting unit 394 transmits information indicating the plurality of risk areas rearranged by the rearrangement unit 330 to the vehicle from which the request information is transmitted.

The selection unit 310 selects, from among the plurality of risk areas of which the position information is stored in the storage unit 380, the plurality of risk areas that fall within a predetermined distance from a position of the vehicle which is the transmission destination. The rearrangement unit 330 rearranges the plurality of risk areas selected by the selection unit 310 in order of proximity to the vehicle which is the transmission destination.

When a number of the risk areas of which the position information is stored in the storage unit 380 exceeds a predetermined threshold below which the risk areas are allowed to be transmitted to the vehicle which is the transmission destination at one time, the selection unit 310 selects, from among the risk areas of which the position information is stored in the storage unit 380, the plurality of risk areas to be transmitted to the transmission destination with the predetermined threshold as an upper limit.

The receiving unit 392 periodically receives the position information of a plurality of terminals including the terminal 82. The server 52 manages the position information of each of the plurality of terminals by storing the position information of the plurality of terminals received by the receiving unit 392 in the storage unit 380.

The receiving unit 392 receives the inquiry information as to whether a moving object is present in a risk area, from the vehicle which is the transmission destination of the plurality of risk areas. This inquiry information includes specifying information for specifying the risk area. The specifying information may include the identification information of the risk area and may include the position information of the risk area. The presence determination unit 320 determines whether a predetermined target object is present in an area determined from position information of the risk area specified by the specifying information from among the plurality of risk areas of which the position information is stored in the storage unit 380. The predetermined target object is, for example, a pedestrian, or the terminal 82 carried by the pedestrian. The presence determination unit 320 determines whether any terminal is present in the risk area specified by the specifying information included in the inquiry information, based on the position information of the plurality of terminals managed by the server 52.

When the presence determination unit 320 determines that the predetermined target object is present in the area determined from the position information of the risk area specified by the risk area specifying information, the transmitting unit 394 transmits the warning information. The transmitting unit 394 may transmit the warning information to the vehicle 60, or may transmit the warning information to the terminal 82 which is present in the risk area.

Figure 6A:
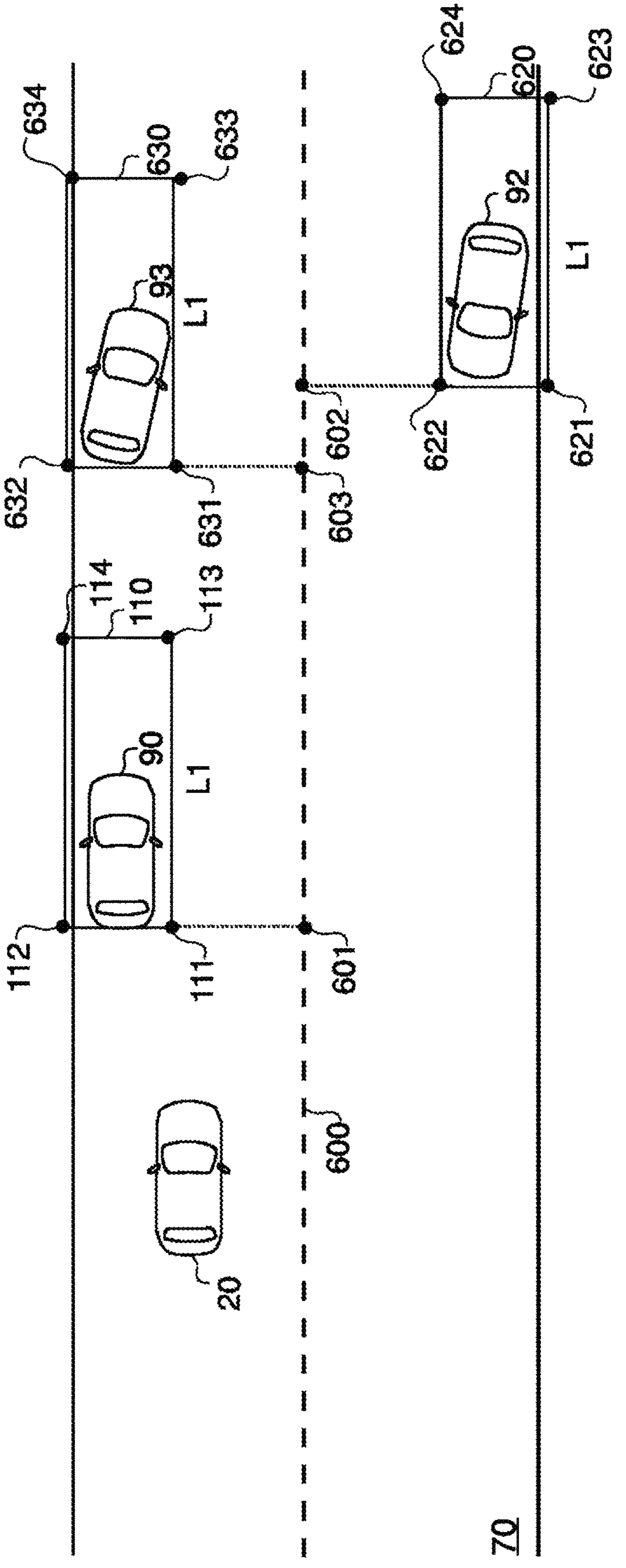
FIG. 6A schematically illustrates the risk area identified by a risk area identifying unit 220 in the vehicle 20.

FIG. 6A schematically illustrates the risk area identified by the risk area identifying unit 220. FIG. 6A illustrates an example of identifying a rectangular area as the risk area.

In the example shown in FIG. 6A, the risk area identifying unit 220 sets the area 110 surrounding a position where the vehicle 90 is present, based on the coordinate information indicating a presence range of the vehicle 90 recognized by the coordinate information acquiring unit 210 from information detected by the sensor 29, and identifies the area 110 as a first risk area. The area 110 is a rectangular area defined by connecting the vertex 111, the vertex 112, the vertex 114, and the vertex 113. Each vertex is set so that a line segment connecting the vertex 111 and the vertex 112 and a line segment connecting the vertex 113 and the vertex 114 are orthogonal to the traveling direction of the vehicle 20, and a line segment connecting the vertex 111 and the vertex 113 and a line segment connecting the vertex 112 and the vertex 114 are parallel to the traveling direction of the vehicle 20. The vertex 113 is determined at a position away from the vertex 111 by the distance L1 in the traveling direction of the vehicle 20, and the vertex 114 is determined at a position away from the vertex 112 by the distance L1 in the traveling direction of the vehicle 20. L1 may be determined according to the vehicle speed of the vehicle 20. L1 may be determined to be longer as the vehicle speed of the vehicle 20 is higher.

Similarly, the risk area identifying unit 220 sets an area 620 surrounding a position where a vehicle 92 is present, based on the coordinate information indicating the presence range of the vehicle 92 recognized by the coordinate information acquiring unit 210 from information detected by the sensor 29, and identifies the area 620 as a second risk area. The area 620 is the rectangular area defined by connecting a vertex 621, a vertex 622, a vertex 624, and a vertex 623. Each vertex is set so that a line segment connecting the vertex 621 and the vertex 622 and a line segment connecting the vertex 623 and the vertex 624 are orthogonal to the traveling direction of the vehicle 20, and a line segment connecting the vertex 621 and the vertex 623 and a line segment connecting the vertex 622 and the vertex 624 are parallel to the traveling direction of the vehicle 20. The vertex 623 is determined at a position away from the vertex 621 by the distance L1 in the traveling direction of the vehicle 20, and the vertex 624 is determined at a position away from the vertex 622 by the distance L1 in the traveling direction of the vehicle 20.

Similarly, the risk area identifying unit 220 sets an area 630 surrounding a position where a vehicle 93 is present, based on the coordinate information indicating the presence range of the vehicle 93 recognized by the coordinate information acquiring unit 210 from information detected by the sensor 29, and identifies the area 630 as a third risk area. The area 630 is the rectangular area defined by connecting the vertex 631, the vertex 632, the vertex 634, and the vertex 633. Each vertex is set so that a line segment connecting the vertex 631 and the vertex 632 and a line segment connecting the vertex 633 and the vertex 634 are orthogonal to the traveling direction of the vehicle 20, and a line segment connecting the vertex 631 and the vertex 633 and a line segment connecting the vertex 632 and the vertex 634 are parallel to the traveling direction of the vehicle 20. The vertex 633 is determined at a position away from the vertex 631 by the distance L1 in the traveling direction of the vehicle 20, and the vertex 634 is determined at a position away from the vertex 632 by the distance L1 in the traveling direction of the vehicle 20.

In the present embodiment, it is assumed that the information processing apparatus 24 of the vehicle 20 recognizes the vehicle 90, the vehicle 92, and the vehicle 93 as the predetermined target object in this order. Accordingly, it is assumed that the risk area identifying unit 220 identifies the area 110, the area 620, and the area 630 as the risk area respectively in this order, and transmits the risk area information on each risk area to the server 52. In the present embodiment, the risk area information of the area 110 includes coordinates of the two vertexes: the vertex 111 and the vertex 112 which are closer to the vehicle 20 from among the vertexes in the area 110, time at which the area 110 is detected by the vehicle 20, information indicating a risk factor, current position information of the vehicle 20, and the traveling direction of the vehicle 20. The risk factor refers to, for example, information indicating such as "Non-Line-of-Sight", which indicates that an area is Non-Line-of-Sight when viewed from the vehicle 20.

When the server 52 receives the risk area information of the area 110, the server 52 identifies an intersection point 601 between a perpendicular line from the vertex 111 which is closer to a center of the road 70 in a direction orthogonal to the traveling direction of the vehicle 20 to a link 600 and the link 600, and stores coordinates of the identified intersection point 601 together with coordinates of the vertexes in the area 110 in the storage unit 380. Similarly, when the server 52 receives the risk area information of the area 620, the server 52 identifies an intersection point 602 between a perpendicular line from the vertex 622 which is closer to the center of the road 70 in the direction orthogonal to the traveling direction of the vehicle 20 to the link 600 and the link 600, and stores coordinates of the identified intersection point 602 together with coordinates of the vertexes in the area 620 in the storage unit 380. Similarly, when the server 52 receives the risk area information of the area 630, the server 52 identifies an intersection point 603 between a perpendicular line from the vertex 631 which is closer to the center of the road 70 in the direction orthogonal to the traveling direction of the vehicle 20 to the link 600 and the link 600, and stores coordinates of the identified intersection point 603 together with coordinates of the vertexes in the area 630 in the storage unit 380.

Figure 6B:
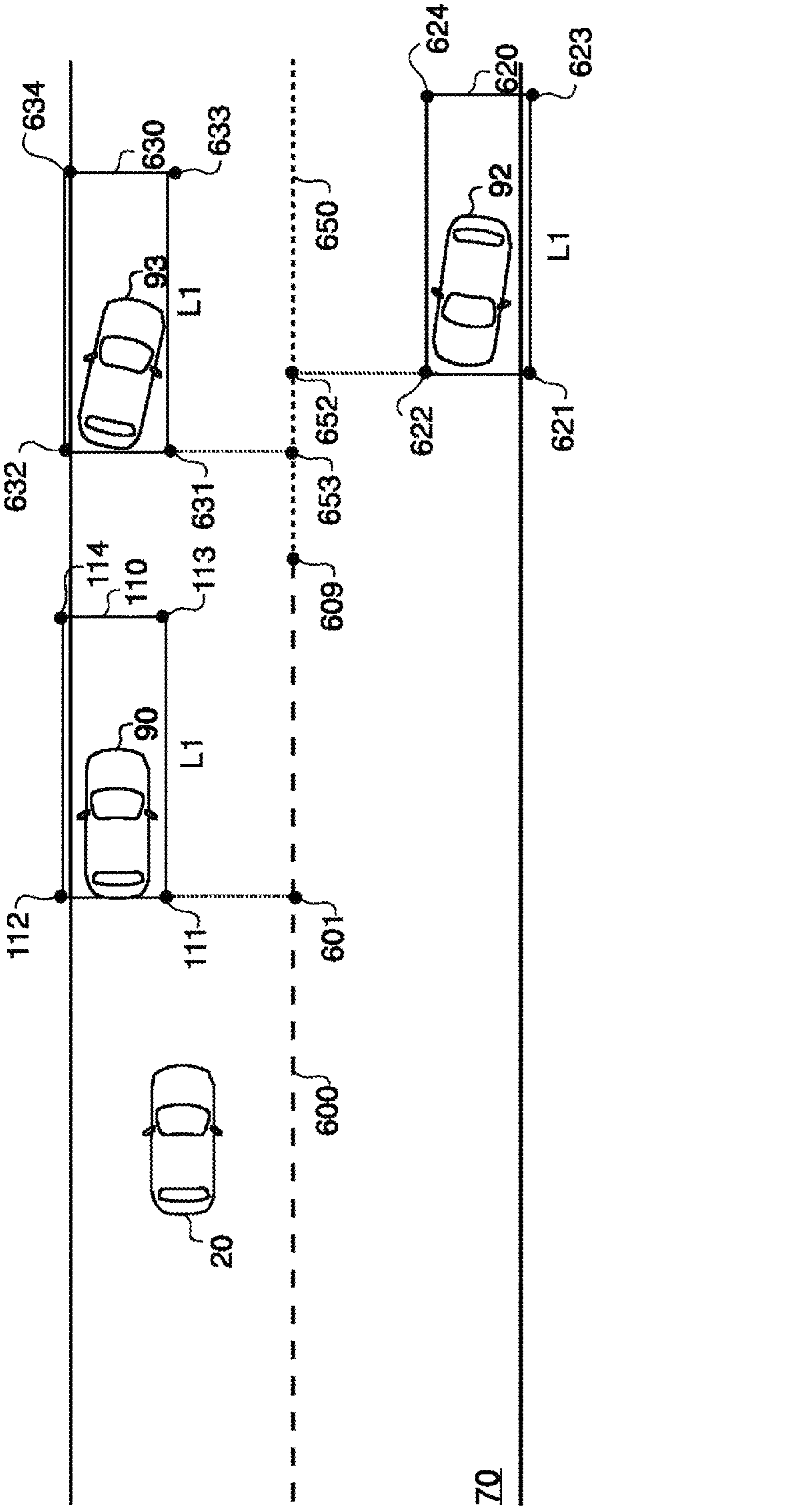
FIG. 6B illustrates a processing by the server 52 when an area 620 and an area 630 are present in a link different from a link 600 to which an area 110 belongs, in FIG. 6A.

FIG. 6B illustrates a processing by the server 52 when the area 620 and the area 630 are present in a link different from the link 600 to which the area 110 belongs, in FIG. 6A. Since a processing in the information processing apparatus 24 of the vehicle 20 is the same as the processing described in relation to FIG. 6A, the description thereof is omitted.

In FIG. 6B, it is assumed that the link 600 has a node 609 as its end point. As is the case with FIG. 6A, when the server 52 receives the risk area information of the area 110, the server 52 identifies the intersection point 601 between a perpendicular line from the vertex 111 to the link 600 on which the vehicle 20 is traveling and the link 600, and stores coordinates of the identified intersection point 601 together with the coordinates of the two vertexes: the vertex 111 and the vertex 112 of the area 110 in the storage unit 380.

When the server 52 receives the risk area information of the area 620 which does not belong to the link 600, the server 52 sets an extension line 650 of the link 600. The extension line 650 is, for example, a straight line extending from a tangent line at the node 609 which is the end point of the link 600. The server 52 identifies an intersection point 652 between a perpendicular line from the vertex 622 to the extension line 650 and the link 600, and stores coordinates of the identified intersection point 652 together with coordinates of the two vertexes: the vertex 621 and the vertex 622 of the area 620 in the storage unit 380. When the server 52 receives the risk area information of the area 630 which does not belong to the link 600, the server 52 identifies an intersection point 653 between a perpendicular line from the vertex 631 to the extension line 650 and the link 600, and stores coordinates of the identified intersection point 653 together with coordinates of the two vertexes: the vertex 631 and the vertex 632 of the area 630 in the storage unit 380.

FIG. 7 shows a data structure of the risk area information stored in the storage unit 380 of the server 52. Data stored in the storage unit 380 as the risk area information includes, as data items, a risk area ID, a detection time, a storage time, the risk factor, risk area coordinates, a link ID, a link intersection point, and an orientation. The storage unit 380 stores one piece of data which has these data items for each risk area.

The risk area ID is the identification information of the plurality of risk areas stored in the storage unit 380 as the risk area information. The risk area ID is the identification information assigned at the server 52 when the server 52 registers one piece of data on the risk area.

The detection time is a time when the risk area is detected in the vehicle 20. The detection time is included in the risk area information transmitted from the information processing apparatus 24.

The storage time is a time when a record of the risk area is stored in the storage unit 380 in the server 52.

The risk factor refers to information for identifying a factor of risk. The factor of risk is included in the risk area information transmitted from the information processing apparatus 24.

The risk area coordinates indicate geographical coordinates of two points for identifying the risk area. The risk area coordinates are coordinates of two vertexes included in the risk area information transmitted from the information processing apparatus 24.

The link ID is the identification information of a link associated with the risk area. The link associated with the risk area may be, for example, a link along which the vehicle 20 is traveling, which is identified through map matching based on a current position of the vehicle 20 and map information stored in the server 52. In another embodiment, the link associated with the risk area may be, for example, a link which corresponds to positions of two vertexes identified through map matching based on coordinates of the two vertexes included in the risk area information and the map information. The server 52 may store in advance the map information including a position of a node indicating a point on a road along which the vehicle travels and a link connecting between a plurality of nodes.

The link intersection point refers to coordinates of an intersection point between a perpendicular line from the two vertexes included in the risk area information to a link identified with the link ID and the link. For example, coordinates of an intersection point between a perpendicular line from the vertex 111 in the area 110 to the link 600 and the link 600 are stored as the link intersection point.

The orientation refers to orientation information associated with the risk area. The orientation information may be information based on the orientation in which the vehicle 20 travels. The server 52 may identify the orientation in which the vehicle 20 travels, based on the traveling direction of the vehicle 20 included in the risk area information. The server 52 may set the orientation associated with the link along which the vehicle 20 travels as the orientation information. The server 52 may set, as the orientation information, information indicating whether the orientation associated with the link along which the vehicle 20 travels is in an inbound or outbound direction.

As shown in FIG. 7, if the area 110, the area 620 and the area 630 are detected in this order in the information processing apparatus 24 of the vehicle 20, data on the risk area is also added in this order in the storage unit 380. That is, the risk area ID "1110001" is the identification information of the area 110, the risk area ID "1210002" is the identification information of the area 620, and the risk area ID "1310003" is the identification information of the area 630.

As described in connection with FIG. 6A, FIG. 6B, FIG. 7, and so forth, the server 52 stores in the storage unit 380 information corresponding to the link 600 on which the vehicle 20 was traveling when the vehicle 20 detected the risk area. Specifically, the server 52 stores in the storage unit 380 the risk area coordinates in association with the link intersection point calculated based on the link 600 and the link ID. As a result, when the selection unit 310 receives the request information transmitted from the vehicle 60 while the vehicle 60 is traveling on the link 600, the selection unit 310 of the server 52 can select the risk area associated with the link 600 on which the vehicle 60 is traveling with a small amount of operations. Further, from the coordinates of the link intersection point stored in the storage unit 380, information on the position closer to the vehicle 60 in the direction along the link 600 can be acquired with the small amount of operations.

Figure 8:
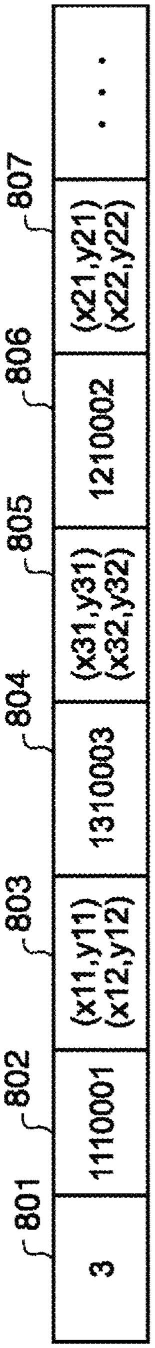
FIG. 8 shows the data structure of the risk area information transmitted to the information processing apparatus 64 as response information to request information from the information processing apparatus 64.

FIG. 8 shows the data structure of the risk area information transmitted to the information processing apparatus 64 as the response information to the request information from the information processing apparatus 64. The data structure shown in FIG. 8 is particularly the data structure of a data portion of the risk area data included in the risk area information transmitted to the information processing apparatus 64. An example in FIG. 8 shows a case where information on three risk areas: the area 110, the area 620, and the area 630 is included in the risk area data. The data in the data structure shown in FIG. 8 is generated by the rearrangement unit 330 as it rearranges the data stored in the storage unit 380 in order of proximity to the position of the vehicle 60.

The risk area data includes a data count unit 801, a first risk area ID unit 802, a first coordinate data unit 803, a second risk area ID unit 804, a second coordinate data unit 805, a third risk area ID unit 806, and a third coordinate data unit 807 in order. The data count unit 801 stores a value indicating a count of the risk area. When the information on the three risk areas shown in FIG. 6A or FIG. 6B is included in the risk area data for transmission, "3" is stored in the data count unit 801.

The risk area ID of the risk area which is closest to the vehicle 60 is stored in the first risk area ID unit 802. The coordinate information of the two vertexes in the risk area closest to the vehicle 60 is stored in the first coordinate data unit 803. In the present embodiment, information on the area 110 is stored in the first risk area ID unit 802 and the first coordinate data unit 803.

The risk area ID of the risk area which is second closest to the vehicle 60 is stored in the second risk area ID unit 804. The coordinate information of the two vertexes in the risk area which is second closest to the vehicle 60 is stored in the second coordinate data unit 805. In the present embodiment, information on the area 630 is stored in the second risk area ID unit 804 and the second coordinate data unit 805.

The risk area ID of the risk area which is third closest to the vehicle 60 is stored in the third risk area ID unit 806. The coordinate information of the two vertexes in the risk area which is third closest to the vehicle 60 is stored in the third coordinate data unit 807. In the present embodiment, information on the area 620 is stored in the third risk area ID unit 806 and the third coordinate data unit 807.

The rearrangement unit 330 generates the risk area data by rearranging the data on the risk area stored in the storage unit 380 in order of proximity to the current position of the vehicle 60 based on the current position of the vehicle 60 included in the request information and the coordinates of the link intersection point included in the risk area information stored in the storage unit 380. In this manner, the risk area data is generated by rearranging the data in order of proximity to the link intersection point from the current position of the vehicle 60, so that the risk areas can be rearranged in order of proximity to the vehicle 60 along the traveling direction of the vehicle 60. As a result, the information processing apparatus 64 can acquire a set of the risk area ID and a coordinate data in order of proximity to the vehicle 60 along the traveling direction of the vehicle 60, by reading the risk area data in order from beginning. Therefore, the information processing apparatus 64 does not need to perform rearrangement along the link in order based on the coordinate data. Further, the information processing apparatus 64 can acquire the data in a correct order along the link along which the vehicle 60 travels with a small amount of operations since the server 52 performs the rearrangement in order in a direction along the link based on the coordinates of the link intersection point.

Figure 9:
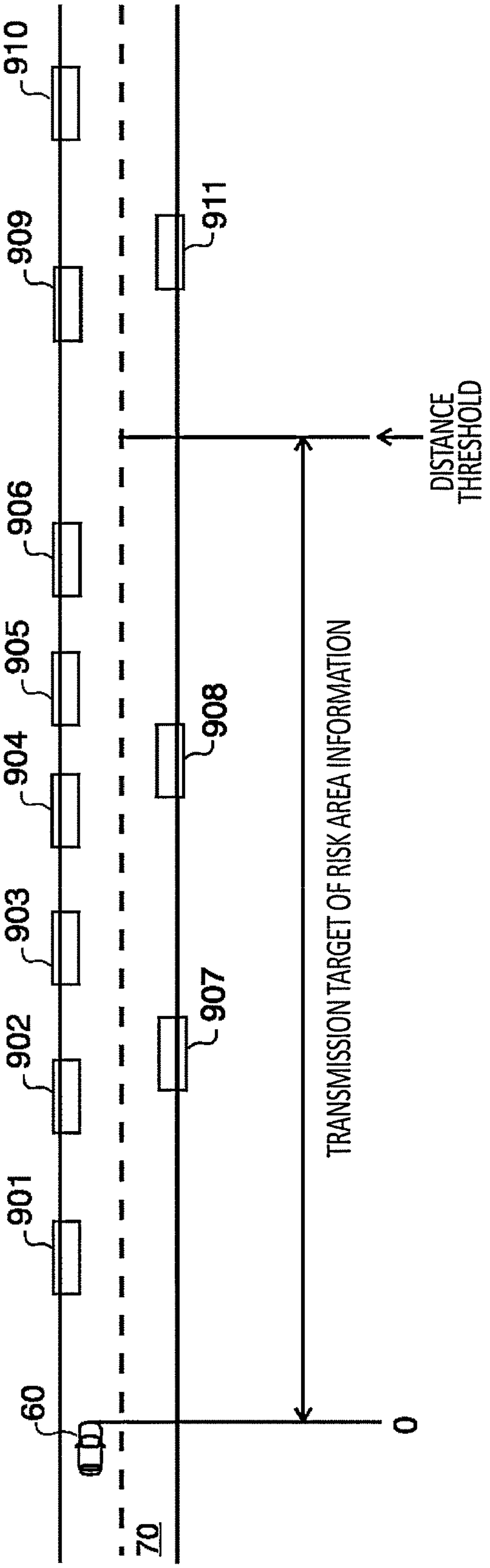
FIG. 9 illustrates a range of the risk area that is transmitted from the server 52 in a single piece of transmission data.

FIG. 9 illustrates a range of the risk area that is transmitted from the server 52 in a single piece of transmission data. When the selection unit 310 receives the request information from the information processing apparatus 64, the selection unit 310 selects the risk area where a distance from the current position of the vehicle 60 in a direction along the traveling direction of the vehicle 60 is equal to or less than a predetermined distance threshold and its count is equal to or less than a predetermined count threshold. A distance threshold may be, for example, on the order of 100 meters or may be on the order of a kilometer. The upper limit of a count threshold is determined according to a data length defined based on a data format of the risk area data transmitted to the information processing apparatus 64. The count threshold may be a value of about 10. At least one of the distance threshold or the count threshold may be specified by the information processing apparatus 64.

FIG. 9 shows a case where a transmission target for the risk area information is limited by the distance threshold when 11 risk areas: a risk area 901, a risk area 902, a risk area 903, a risk area 904, a risk area 905, a risk area 906, a risk area 907, a risk area 908, a risk area 909, a risk area 910, and a risk area 911 are stored in the storage unit 380 as the risk area information.

The selection unit 310 selects eight risk areas: the risk area 901, the risk area 902, the risk area 903, the risk area 904, the risk area 905, the risk area 906, the risk area 907, and the risk area 908 where a distance from the current position of the vehicle 60 to the link intersection point of the risk area is equal to or less than the predetermined distance threshold. At this time, the selection unit 310 may select the risk area regardless of whether it is associated with a same link as the link along which the vehicle 60 is currently traveling. Note that the selection unit 310 may only select the risk area associated with the link along which the vehicle 60 is predicted to travel, if a plurality of links are connected beyond the link along which the vehicle 60 is traveling, and a future traveling route of the vehicle 60 is unknown.

The rearrangement unit 330 generates the risk area data including a data count, the risk area ID, and the coordinate data by rearranging the risk areas selected by the selection unit 310 in the order of: the risk area 901, the risk area 902, the risk area 907, the risk area 903, the risk area 904, the risk area 908, the risk area 905 and the risk area 906. The transmitting unit 394 transmits the risk area information including the transmission data generated by the rearrangement unit 330 to the information processing apparatus 64.

When a number of risk areas where the distance from the current position of the vehicle 60 to the link intersection point of the risk area is equal to or less than the distance threshold exceeds the predetermined count threshold, the selection unit 310 selects the risk area with the count threshold as the upper limit.

Figure 10:
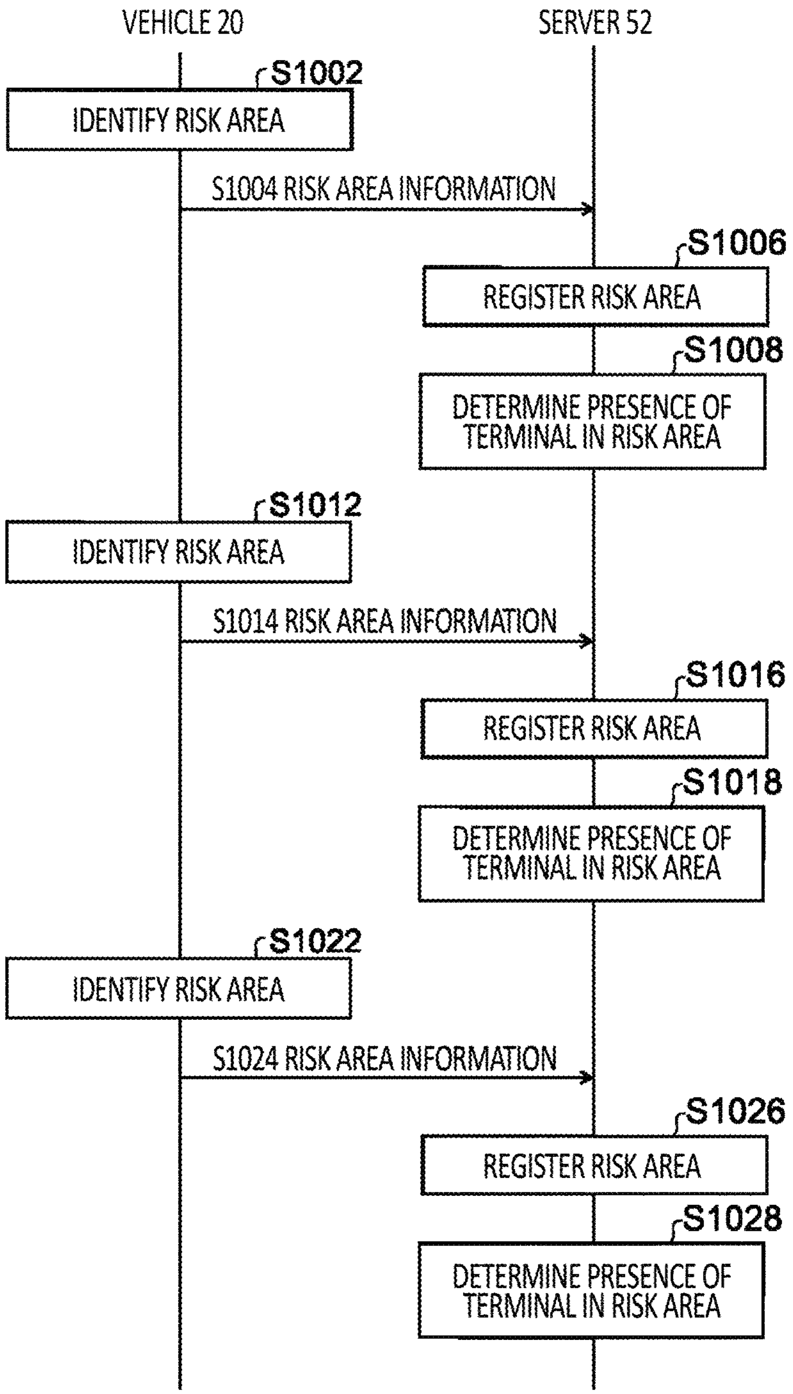
FIG. 10 schematically illustrates a process flow related to an information processing method performed by the vehicle 20 and the server 52.

FIG. 10 schematically illustrates a process flow related to an information processing method performed by the vehicle 20 and the server 52. At S1002, the risk area identifying unit 220 of the vehicle 20 identifies the risk area based on information recognized by the sensor 29. For example, the risk area identifying unit 220 determines the four vertexes which define the risk area 110, based on the coordinate information of the stopped vehicle 90 output by the sensor 29 acquired by the coordinate information acquiring unit 210.

At S1004, the communication apparatus 48 transmits the risk area information to the server 52 inquiring whether a predetermined target is present in the risk area. When the server 52 receives the risk area information transmitted from the vehicle 20, at S1006, the storage unit 380 registers the coordinate information of the two vertexes closer to the vehicle 20 from among the coordinates of the vertexes included in the risk area information received from the information processing apparatus 24 as the risk area coordinates.

At S1008, the presence determination unit 320 determines whether the terminal 82 is present in the area defined by the four vertexes included in the risk area information received from the vehicle 20. For example, in a situation shown in FIG. 1, the presence determination unit 320 determines that the terminal 82 is not present in the area 110 defined by the four vertexes included in the risk area information. In this case, the transmitting unit 394 does not transmit the response information to the risk area information to the vehicle 20. If the terminal 82 is not present in the area defined by the four vertexes included in the risk area information, the transmitting unit 394 may transmit the response information to the vehicle 20 notifying that the target is not present in the risk area.

At S1012, the risk area identifying unit 220 of the vehicle 20 identifies the risk area based on the information recognized by the sensor 29. For example, the risk area identifying unit 220 determines the four vertexes which define the risk area 620, based on the coordinate information of the stopped vehicle 92 output by the sensor 29 acquired by the coordinate information acquiring unit 210.

At S1014, the communication apparatus 48 transmits the risk area information to the server 52 inquiring whether the predetermined target is present in the risk area. When the server 52 receives the risk area information transmitted from the vehicle 20, at S1016, the storage unit 380 registers the coordinate information of the two vertexes closer to the vehicle 20 from among the coordinates of the vertexes included in the risk area information received from the information processing apparatus 24 as the risk area coordinates.

At S1018, the presence determination unit 320 determines whether the terminal 82 is present in the area defined by the four vertexes included in the risk area information received from the vehicle 20. In the present flowchart, it is assumed that the presence determination unit 320 determines that the terminal 82 is not present in the area defined by the four vertexes included in the risk area information. Therefore, in the present flowchart, the transmitting unit 394 does not transmit the response information to the risk area information to the vehicle 20.

At S1022, the risk area identifying unit 220 of the vehicle 20 identifies the risk area based on the information recognized by the sensor 29. For example, the risk area identifying unit 220 determines the four vertexes which define the risk area 630, based on the coordinate information of the stopped vehicle 93 output by the sensor 29 acquired by the coordinate information acquiring unit 210.

At S1024, the communication apparatus 48 transmits the risk area information to the server 52 inquiring whether the predetermined target is present in the risk area. When the server 52 receives the risk area information transmitted from the vehicle 20, at S1026, the storage unit 380 registers the coordinate information of the two vertexes closer to the vehicle 20 from among the coordinates of the vertexes included in the risk area information received from the information processing apparatus 24 as the risk area coordinates.

At S1028, the presence determination unit 320 determines whether the terminal 82 is present in the area defined by the four vertexes included in the risk area information received from the vehicle 20. As described above, in the present flowchart, it is assumed to be determined that the terminal 82 is not present in the area defined by the four vertexes included in the risk area information, and no response information to the risk area information is transmitted to the vehicle 20.

In the present flowchart, an example of a case is shown where the server 52 registers the position information of the risk area detected by the vehicle 20, but the server 52 can register the risk area detected by a plurality of vehicles.

Figure 11:
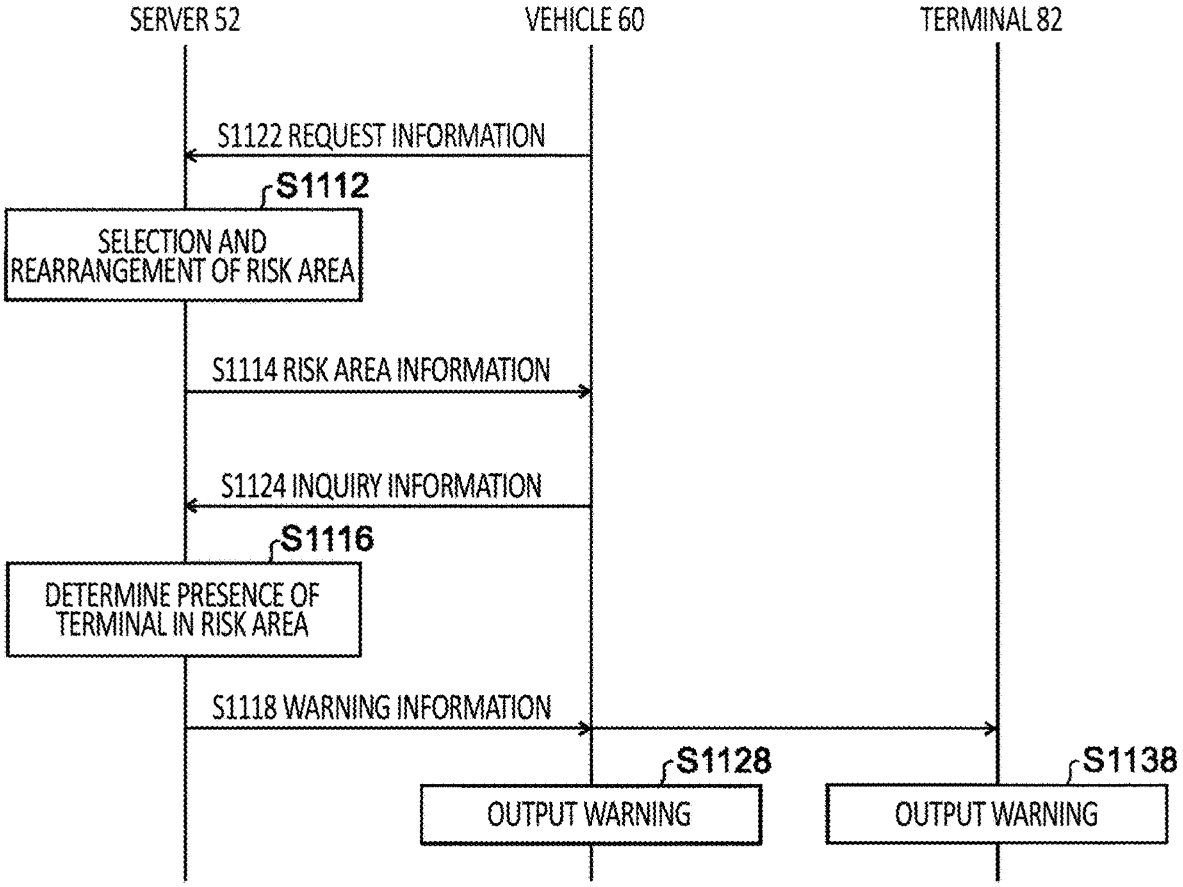
FIG. 11 schematically illustrates the process flow related to the information processing method performed by the server 52, the vehicle 60, and a terminal 82.

FIG. 11 schematically illustrates the process flow related to the information processing method performed by the server 52, the vehicle 60, and the terminal 82. The processing in FIG. 11 is performed subsequent to FIG. 10.

At S1122, the information processing apparatus 64 of the vehicle 60 transmits the request information to server 52 for requesting the position information of the risk area. This request information may include information indicating the position of the vehicle 60 and the traveling direction of the vehicle 60. When the server 52 receives the request information, at S1112, the risk area which is the transmission target is selected by the selection unit 310 and the risk area information is rearranged by the rearrangement unit 330. At S1114, the communication apparatus 390 transmits the risk area information as the response information to the request information to the vehicle 60. The risk area transmitted to the vehicle 60 at S1114 includes the coordinate information of the two vertexes in the risk area rearranged by the rearrangement unit 330 and the risk area ID as the transmission data.

At S1124, the information processing apparatus 64 transmits the inquiry information to the server 52 when the information processing apparatus 64 determines that the vehicle 60 approaches the position indicated by the coordinate information of the vertex, based on the current position of the vehicle 60 and the coordinate information of the vertex received from the server 52. The inquiry information includes the risk area ID of the risk area closest to the vehicle 60 from among the risk areas in the traveling direction of the vehicle 60. The inquiry information may include information indicating the current position, the traveling direction, and the vehicle speed of the vehicle 60.

When server 52 receives the inquiry information transmitted from the vehicle 60, at S1116, the presence determination unit 320 determines whether the terminal 82 is present in the area set from the two vertexes in the risk area coordinates associated with the risk area ID included in the inquiry information received from the vehicle 60. For example, in a situation shown in FIG. 3, the presence determination unit 320 identifies the vertex 113A and the vertex 114A from the two vertexes: the vertex 111 and the vertex 112 associated with the risk area ID included in the inquiry information, and determines that the terminal 82 is present in the area 110 defined by these four vertexes. In this case, at S1118, the transmitting unit 394 transmits the warning information to the vehicle 60 notifying that the terminal 82 is present in the area as the response information to the inquiry information. In addition, the transmitting unit 394 transmits to the terminal 82 the warning information notifying that a vehicle is approaching.

When the information processing apparatus 64 receives the warning information from the server 52, at S1128, the information processing apparatus 64 outputs the warning to the passenger of the vehicle 60 using the HMI function included in the information output apparatus 40. Further, when the terminal 82 receives the warning information from the server 52, at S1138, the terminal 82 outputs the warning to the person 80 using the HMI function of the terminal 82.

Communication between the information processing apparatus 24 and the server 52 and between the information processing apparatus 64 and the server 52 may be performed using a communication scheme compliant with Cellular-V2X. Cellular-V2X includes communication schemes such as LTE-V2X PC5 and 5G-V2X PC5. In another embodiment, for the communication between the information processing apparatus 24 and the server 52 and between the information processing apparatus 64 and the server 52, a form using WI-FI (registered trademark) and DSRC (Dedicated Short Range Communications) may be adopted. For the communication between the information processing apparatus 24 and the server 52 and between the information processing apparatus 64 and the server 52, besides Cellular-V2X, DSRC (Dedicated Short Range Communications) (registered trademark) and the like, any communication scheme such as BLUETOOTH (registered trademark) may be adopted. The information processing apparatus 24 and the information processing apparatus 64 may communicate with the server 52 by using a communication infrastructure included in Intelligent Transport Systems (ITS).

The vehicle 20 and the vehicle 60 may be examples of transportation equipment. The transportation equipment may include an automobile such as a passenger car and a bus, a saddle-riding type vehicle, bicycle, and the like. Moreover, although the system 10 functions as a system for performing warning when the terminal 82 is present in the risk area in the present embodiment described above, the system 10 may also function as a system for performing warning when any communication apparatus other than the terminal 82, of which the position information can be managed by the server 52, is present. Such a communication apparatus may be included in any vehicle such as the automobile, the saddle-riding type vehicle and the bicycle.

According to the system 10 described above, information on the plurality of risk areas stored by the server 52 can be rearranged according to the distance from the vehicle 60 and transmitted to the vehicle 60. This makes it unnecessary for the vehicle 60 to perform the rearrangement of the risk area received from the server 52, thereby making it possible to reduce a processing burden on the vehicle 60. In addition, since the server 52 stores the risk area in association with the link along which the vehicle 20 travels, the server 52 can quickly select the risk area-related information which is appropriate according to the link along which the vehicle 60 travels, in response to a request from the vehicle 60 traveling on that link.

Figure 12:
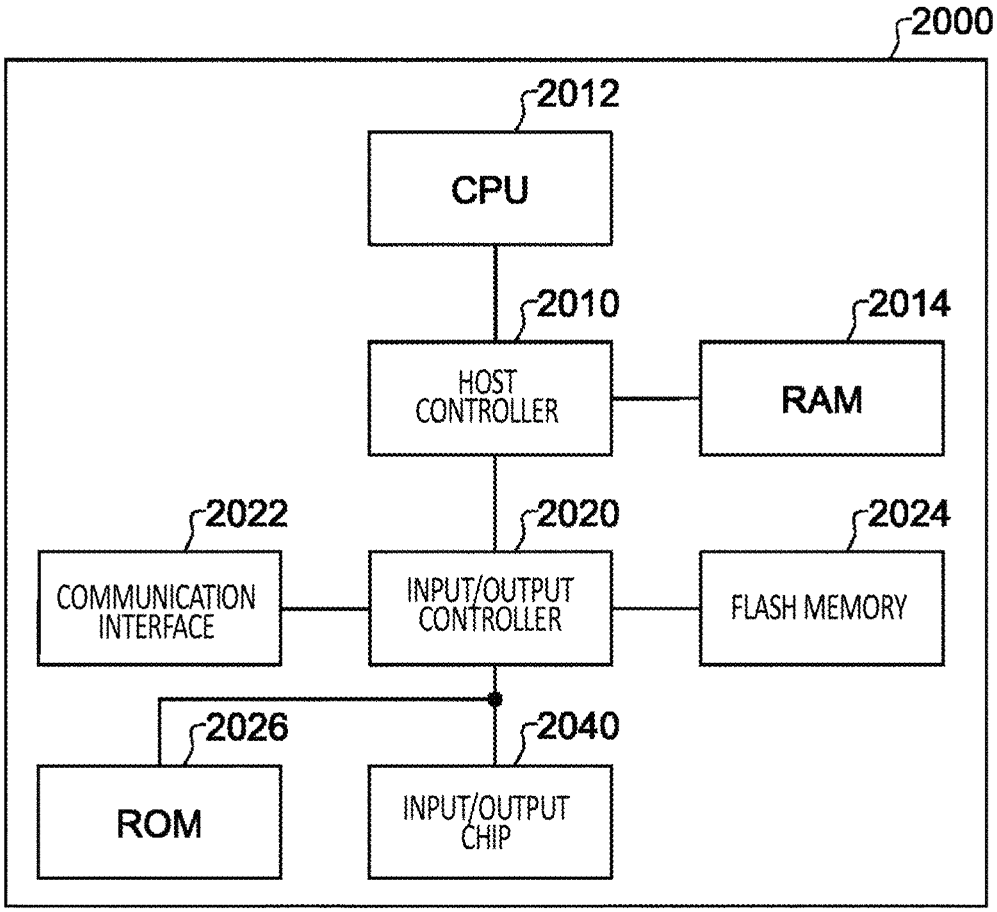
FIG. 12 illustrates an example of a computer 2000.

FIG. 12 illustrates an example of a computer 2000 in which a plurality of embodiments of the present invention may be entirely or partially embodied. A program installed in the computer 2000 can cause the computer 2000 to function as an apparatus such as the information processing apparatus 24 according to the embodiment or respective units of the apparatus, or function as a server such as the server 52 according to the embodiment or the respective units of the server, or can cause the computer 2000 to perform operations associated with the apparatus, the respective units of the apparatus, the server, or the respective units of the server, and/or can cause the computer 2000 to perform a process according to the embodiment or operations of the process. Such a program may be executed by a CPU 2012 in order to cause the computer 2000 to perform a particular operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to a program stored in the ROM 2026 and the RAM 2014 and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

The programs are provided via a network or a computer-readable storage medium such as a CD-ROM, a DVD-ROM, or a memory card. The RAM 2014, the ROM 2026, or the flash memory 2024 is an example of the computer-readable storage medium. The programs are installed in the flash memory 2024, the RAM 2014, or the ROM 2026, and executed by the CPU 2012. Information processing written in these programs is read by the computer 2000 and provides cooperation between the programs and the various types of hardware resources described above. An apparatus or a method may be configured by implementing operations or processing of information according to a use of the computer 2000.

For example, when a communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads the transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014 and the like, and execute various kinds of processing on the data on the RAM 2014. Next, the CPU 2012 writes back the processed data into the recording medium.

Various types of information such as various types of programs, data, a table, and a database may be stored in the recording medium and subjected to information processing. The CPU 2012 may execute, on the data read from the RAM 2014, various kinds of processing including various kinds of operations, information processing, conditional judgement, conditional branching, unconditional branching, information search/replacement, or the like described in the present specification and designated by instruction sequences of the programs, and write back a result into the RAM 2014. In addition, the CPU 2012 may search for information in a file, a database, or the like in the recording medium. For example, when a plurality of entries each having an attribute value of a first attribute associated with an attribute value of a second attribute, is stored in the recording medium, the CPU 2012 may search for an entry having a designated attribute value of the first attribute that matches a condition from these plurality of entries, and read the attribute value of the second attribute stored in this entry, thereby obtaining the attribute value of the second attribute associated with the first attribute that satisfies a predetermined condition.

The programs or software module described above may be stored on the computer 2000 or in a computer-readable storage medium near the computer 2000. A recording medium such as a hard disk or a RAM provided in a server system connected to a dedicated communication network or the Internet can be used as the computer-readable storage medium. The programs stored in the computer-readable storage medium may be provided to the computer 2000 via a network.

A program that is installed in the computer 2000 and causes the computer 2000 to function as the server 52 may work on the CPU 2012 and the like to cause the computer 2000 to function as each unit of the server 52, respectively. The information processing written in these programs are read by the computer 2000 to cause the computer to function as each unit of the server 52, which is a specific means realized by the cooperation of software and the various types of hardware resources described above. Then, with these specific means, by implementing operations or processing of information according to an intended use of the computer 2000 in the present embodiment, the specific server 52 is constructed according to the intended use.

The program installed onto the computer 2000 and causing the computer 2000 to function as the information processing apparatus 24 may work on the CPU 2012 or the like to cause the computer 2000 to function as each unit of the information processing apparatus 24 respectively. The information processing written in these programs are read by the computer 2000 to cause the computer to function as each unit of the information processing apparatus 24, which is a specific means realized by the cooperation of software and the various kinds of hardware resources described above. Then, these specific means implement operations or processing of information according to the intended use of the computer 2000 in the present embodiment, so that the information processing apparatus 24 is constructed as a specific information processing apparatus according to the intended use.

Various embodiments have been described with reference to the block diagrams and the like. In the block diagrams, each block may represent (1) a stage of a process in which an operation is performed, or (2) each unit of the apparatus having a role in performing the operation. A particular stage and each unit may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including such as logical AND, logical OR, logical XOR, logical NAND, logical NOR, and another logical operation, and a memory element such as a flip-flop, a register, a field programmable gate array (FPGA), a programmable logic array (PLA), or the like.

The computer-readable storage medium may include any tangible device capable of storing instructions to be executed by an appropriate device and thereby the computer-readable storage medium having instructions stored therein constitutes at least a part of a product including instructions which can be executed to provide means for executing processing procedures or operations designated in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a FLOPPY (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disc (DVD), a BLU-RAY (registered trademark) disc, a memory stick, an integrated circuit card, and the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as SMALLTALK (registered trademark), JAVA (registered trademark), C++, and the like, and a conventional procedural programming language such as a "C" programming language or a similar programming language.

Computer-readable instructions may be provided to a processor of a general purpose computer, a special purpose computer, or another programmable data processing apparatus, or to programmable circuit, locally or via a local area network (LAN), a wide area network (WAN) such as the Internet and the like, and a computer-readable instruction may be executed to provide means for executing operations designated in the described processing procedures or block diagrams. Examples of the processor include a computer processor, a processing unit, a microprocessor, a digital signal processor, a controller, a microcontroller, and the like.

While the present invention has been described above by way of the embodiments, the technical scope of the present invention is not limited to the scope described in the above-described embodiments. It is apparent to persons skilled in the art that various alterations or improvements can be made to the above-described embodiments. It is also apparent from the description of the claims that the form to which such alterations or improvements are made can be included in the technical scope of the present invention.

It should be noted that the operations, procedures, steps, stages, and the like of each process performed by the apparatus, the system, the program, and the method shown in the claims, specification, and drawings can be implemented in any order as long as the order is not specifically and explicitly indicated by "before", "prior to", or the like and as long as the output from a previous process is not used in a later process. Even if the operation flow is described by using phrases such as "first" or "next" for the sake of convenience in the claims, specification, and drawings, it does not necessarily mean that the process must be performed in this order.

EXPLANATION OF REFERENCES

10: system
20: vehicle
21: radar
22: camera
24: information processing apparatus
25: GNSS receiving unit
26: vehicle speed sensor
29: sensor
40: information output apparatus
48: communication apparatus
50: base station
52: server

60: vehicle
64: information processing apparatus
70: road
80: person
82: terminal
90 vehicle
92: vehicle
93: vehicle
110: area
111: vertex
112: vertex
113: vertex
114: vertex
200: control unit
208: control unit
210: coordinate information acquiring unit
220: risk area identifying unit
280: storage unit
300: control unit
310: selection unit
320: presence determination unit
330: rearrangement unit
380: storage unit
390: communication apparatus
392: receiving unit
394: transmitting unit
600: link
601: intersection point
602: intersection point
603: intersection point
609: node
620: area
621: vertex
622: vertex
623: vertex
624: vertex
630: area
631: vertex
632: vertex
633: vertex
634: vertex
650: extension line
652: intersection point
653: intersection point
801: data count unit
802: first risk area ID unit
803: first coordinate data unit
804: second risk area ID unit
805: second coordinate data unit
806: third risk area ID unit
807: third coordinate data unit
901: risk area
902: risk area
903: risk area
904: risk area
905: risk area
906: risk area
907: risk area
908: risk area
909: risk area
910: risk area
911: risk area
2000: computer
2010: host controller
2012: CPU
2014: RAM
2020: input/output controller
2022: communication interface
2024: flash memory
2026: ROM
2040: input/output chip.

What is claimed is:

1. A risk area information transmitting apparatus comprising:

a receiving unit which (a) receives, from a first vehicle, risk area information about a plurality of risk areas which are identified by the first vehicle and which may pose a risk for the first vehicle to travel, and (b) receives, from a second vehicle that is different from the first vehicle, request information for requesting position information of the plurality of risk areas;

a storage unit which stores the position information of the plurality of risk areas received from the first vehicle;

a rearrangement unit which rearranges the plurality of risk areas stored in the storage unit in order of proximity to the second vehicle in response to receiving the request information from the second vehicle; and a transmitting unit which transmits the position information of the plurality of risk areas rearranged by the rearrangement unit to the second vehicle.

2. The risk area information transmitting apparatus according to claim 1, wherein the rearrangement unit rearranges the plurality of risk areas in order of proximity to the second vehicle to generate transmission data including the position information of the plurality of risk areas; and the transmitting unit transmits the transmission data generated by the rearrangement unit to the second vehicle.

3. The risk area information transmitting apparatus according to claim 2, wherein the rearrangement unit rearranges the plurality of risk areas in order of proximity to the second vehicle along a traveling direction of the second vehicle.

4. The risk area information transmitting apparatus according to claim 2, wherein the storage unit stores the position information of the plurality of risk areas further in association with coordinate information of an intersection point between a perpendicular line from a predetermined point for identifying a position of each of the plurality of risk areas to a link along which the first vehicle travels and the link; and the rearrangement unit rearranges, based on the coordinate information of the intersection point between the perpendicular line and the link, the plurality of risk areas in order of proximity to the second vehicle along a traveling direction of the second vehicle.

5. The risk area information transmitting apparatus according to claim 2, further comprising:

a selection unit which selects, from among the plurality of risk areas of which position information is stored in the storage unit, a plurality of risk areas that fall within a predetermined distance from a position of the second vehicle, wherein the rearrangement unit rearranges the plurality of risk areas selected by the selection unit in order of proximity to the second vehicle.

6. The risk area information transmitting apparatus according to claim 5, wherein when a number of the plurality of risk areas of which position information is stored in the storage unit exceeds a predetermined threshold below which risk areas are allowed to be transmitted by the transmitting unit at one time, the selection unit selects, from among the plurality of risk areas of which position information is stored in the storage unit, the plurality of risk areas to be transmitted to the second vehicle with the predetermined threshold as an upper limit.

7. The risk area information transmitting apparatus according to claim 2, wherein the receiving unit receives, from the second vehicle, inquiry information as to whether a moving object is present in a risk area, the inquiry information includes specifying information for specifying the risk area, the risk area information transmitting apparatus further comprises:

a presence determination unit which determines whether a predetermined target object is present in an area determined from position information of the risk area specified by the specifying information from among the plurality of risk areas of which position information is stored in the storage unit, wherein the transmitting unit further transmits warning information when the presence determination unit determines that the predetermined target object is present in the area determined from the position information of the risk area identified from the specifying information.

8. The risk area information transmitting apparatus according to claim 1, wherein the rearrangement unit rearranges the plurality of risk areas in order of proximity to the second vehicle along a traveling direction of the second vehicle.

9. The risk area information transmitting apparatus according to claim 8, further comprising:

a selection unit which selects, from among the plurality of risk areas of which position information is stored in the storage unit, a plurality of risk areas that fall within a predetermined distance from a position of the second vehicle, wherein the rearrangement unit rearranges the plurality of risk areas selected by the selection unit in order of proximity to the second vehicle.

10. The risk area information transmitting apparatus according to claim 8, wherein the receiving unit receives, from the second vehicle, inquiry information as to whether a moving object is present in a risk area, the inquiry information includes specifying information for specifying the risk area, the risk area information transmitting apparatus further comprises:

a presence determination unit which determines whether a predetermined target object is present in an area determined from position information of the risk area specified by the specifying information from among the plurality of risk areas of which position information is stored in the storage unit, wherein the transmitting unit further transmits warning information when the presence determination unit determines that the predetermined target object is present in the area determined from the position information of the risk area identified from the specifying information.

11. The risk area information transmitting apparatus according to claim 1, wherein the storage unit stores the position information of the plurality of risk areas further in association with coordinate information of an intersection point between a perpendicular line from a predetermined point for identifying a position of each of the plurality of risk areas to a link along which the first vehicle travels and the link; and the rearrangement unit rearranges, based on the coordinate information of the intersection point between the perpendicular line and the link, the plurality of risk areas in order of proximity to the second vehicle along a traveling direction of the second vehicle.

12. The risk area information transmitting apparatus according to claim 1, further comprising:

a selection unit which selects, from among the plurality of risk areas of which position information is stored in the storage unit, a plurality of risk areas that fall within a predetermined distance from a position of the second vehicle, wherein the rearrangement unit rearranges the plurality of risk areas selected by the selection unit in order of proximity to the second vehicle.

13. The risk area information transmitting apparatus according to claim 12, wherein when a number of the plurality of risk areas of which position information is stored in the storage unit exceeds a predetermined threshold below which risk areas are allowed to be transmitted by the transmitting unit at one time, the selection unit selects, from among the plurality of risk areas of which position information is stored in the storage unit, the plurality of risk areas to be transmitted to the second vehicle with the predetermined threshold as an upper limit.

14. The risk area information transmitting apparatus according to claim 1, wherein the receiving unit receives, from the second vehicle, inquiry information as to whether a moving object is present in a risk area, the inquiry information includes specifying information for specifying the risk area, the risk area information transmitting apparatus further comprises:

a presence determination unit which determines whether a predetermined target object is present in an area determined from position information of the risk area specified by the specifying information from among the plurality of risk areas of which position information is stored in the storage unit, wherein the transmitting unit further transmits warning information when the presence determination unit determines that the predetermined target object is present in the area determined from the position information of the risk area identified from the specifying information.

15. The risk area information transmitting apparatus according to claim 1, wherein the risk area information transmitting apparatus is a mobile edge computing (MEC) server.

16. A risk area information transmitting method comprising:

receiving, from a first vehicle, risk area information about a plurality of risk areas which are identified by the first vehicle and which may pose a risk for the first vehicle to travel;

receiving, from a second vehicle that is different from the first vehicle, request information for requesting position information of the plurality of risk areas;

storing the position information of the plurality of risk areas received from the first vehicle;

rearranging the plurality of risk areas that is stored in order of proximity to the second vehicle in response to receiving the request information from the second vehicle; and transmitting the position information of the plurality of risk areas that is rearranged to the second vehicle.

17. A non-transitory computer-readable storage medium having stored therein a program to cause a computer to function as:

a receiving unit which (a) receives, from a first vehicle, risk area information about a plurality of risk areas which are identified by the first vehicle and which may pose a risk for the first vehicle to travel, and (b) receives, from a second vehicle that is different from the first vehicle, request information for requesting position information of the plurality of risk areas;

a storage unit which stores the position information of the plurality of risk areas received from the first vehicle;

a rearrangement unit which rearranges the plurality of risk areas stored in the storage unit in order of proximity to the second vehicle in response to receiving the request information from the second vehicle; and a transmitting unit which transmits the position information of the plurality of risk areas rearranged by the rearrangement unit to the second vehicle.

* * * * *